Figure 1:
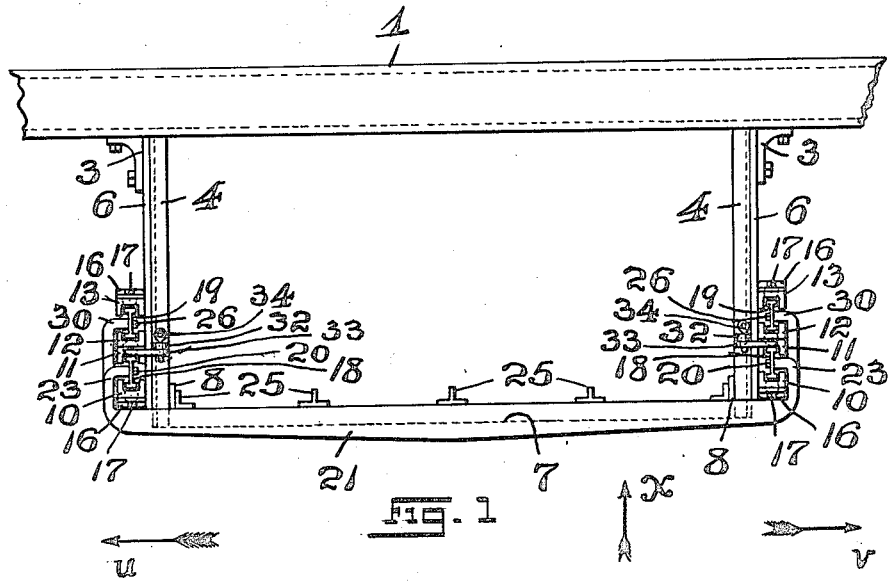

S. G. THOMPSON.
BATTERY SUPPORTING CRADLE FOR VEHICLES.
APPLICATION FILED APR. 25, 1913.

1,081,706.

Patented Dec. 16, 1913.

2 SHEETS—SHEET 1.

WITNESSES:
Fredk. H. W. Fraentzel
Clayton S. Cadmus

INVENTOR:
Stephen G. Thompson,
BY
Fraentzel and Richards,
ATTORNEYS

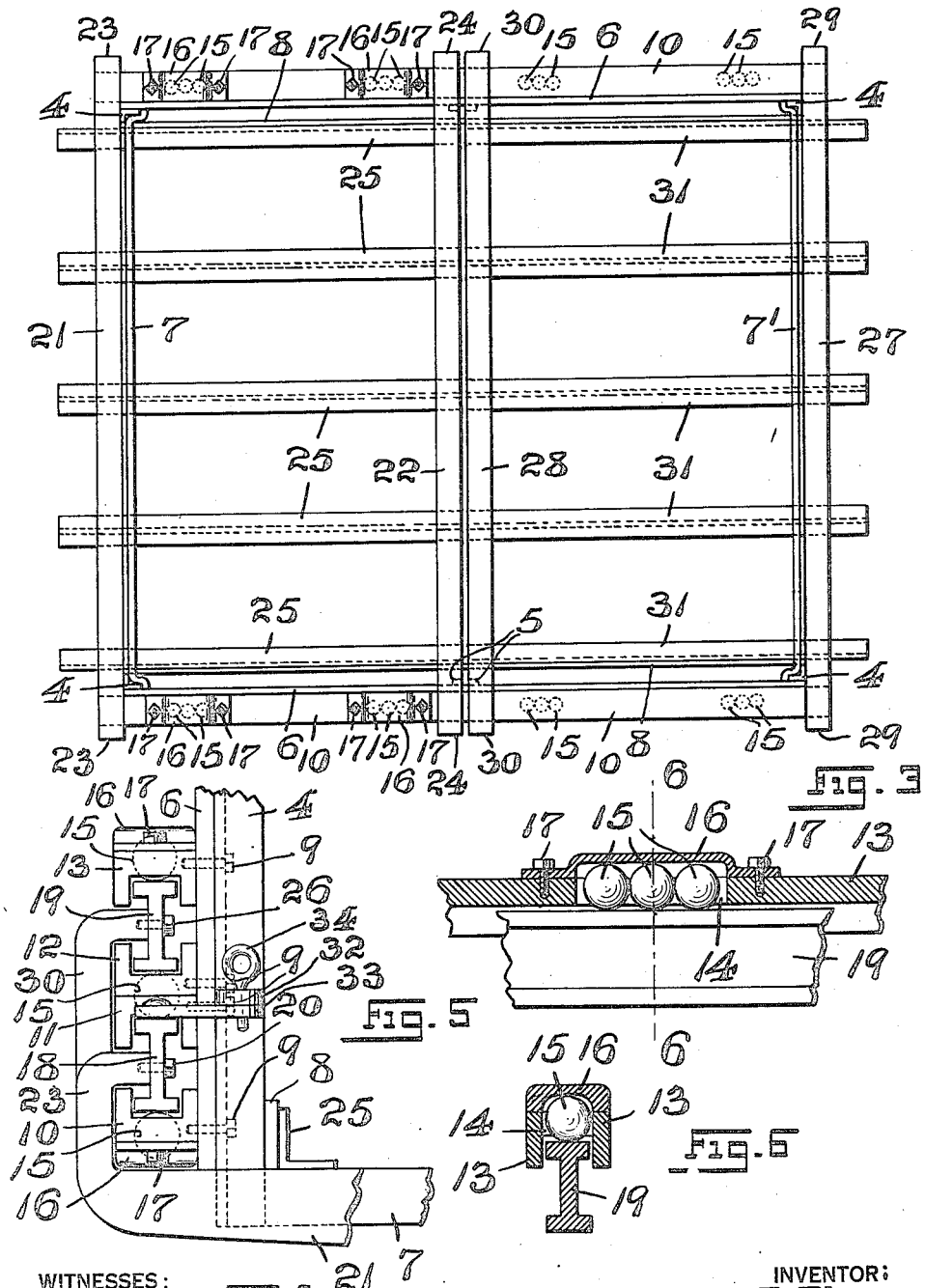

UNITED STATES PATENT OFFICE.

STEPHEN G. THOMPSON, OF JERSEY CITY, NEW JERSEY.

BATTERY-SUPPORTING CRADLE FOR VEHICLES.

1,081,706.

Specification of Letters Patent.

Patented Dec. 16, 1913.

Application filed April 25, 1913. Serial No. 763,478.

*To all whom it may concern:*

Be it known that I, STEPHEN G. THOMPSON, a citizen of the United States, residing at Jersey City, in the county of Hudson and State of New Jersey, have invented certain new and useful Improvements in Battery-Supporting Cradles for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvement in battery-supporting cradles for electric vehicles; and, the present invention relates, more particularly, to a novel device in the form of a support which is suspended from the chassis-frame of an electric vehicle, the device being provided with slidably arranged elements for the arrangement of a number of storage batteries thereon, the said battery-carrying elements being adapted to be moved from beneath the vehicle to either side thereof when it is desired to remove and to replace, or inspect the batteries.

The invention has for its principal object to provide a novel and simply-constructed battery-supporting cradle of the general character hereinafter more particularly set forth, with a view of providing a structure which is easily and readily manipulated, for moving from beneath the vehicle, to either side thereof, suitably disposed carrying elements or platforms upon which are placed the usual complement of storage batteries.

Other objects of this invention not at this time more particularly enumerated will be clearly understood from the following detailed description of the present invention.

With the objects of the present invention in view, the said invention consists, primarily, in the novel battery-supporting cradle for electric vehicles hereinafter set forth; and, the invention consists, furthermore, in the novel arrangements and combinations of the various devices and parts, as well as in the details of the construction of the same, all of which will be more fully described in the following specification, and then finally embodied in the clauses of the claim which are appended thereto and which form an essential part of this specification.

The invention is clearly illustrated in the accompanying drawings, in which:—

Figure 2:
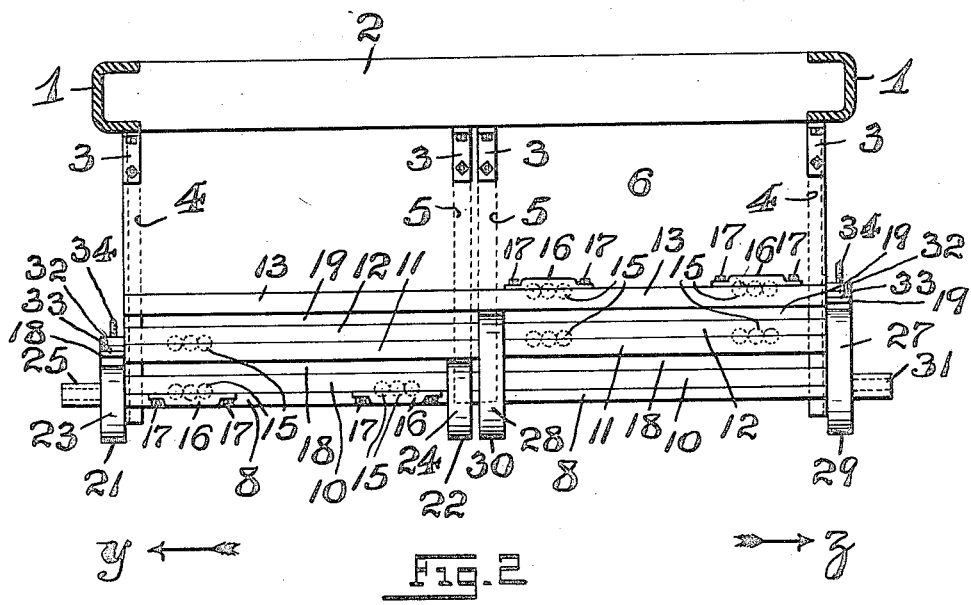

Figure 1 is an end elevation of a battery-supporting cradle, showing one embodiment of the principles of the present invention, attached to the chassis-frame of a vehicle, said frame being represented broken away and shown in side elevation. Fig. 2 is a side elevation of the battery-supporting cradle, with the chassis-frame represented in transverse vertical section. Fig. 3 is a bottom-plan view of the battery-supporting cradle, looking in the direction of the arrow *x* in said Fig. 1. Fig. 4 is an end view of one of the corner-portions of the battery-supporting cradle, said view being made on an enlarged scale. Fig. 5 is a longitudinal vertical sectional representation of one form of one of the anti-friction bearings arranged between the movable parts of the battery-supporting cradle; and Fig. 6 is a cross-section of the same, said section being taken on line 6—6 in said Fig. 5.

Similar characters of reference are employed in all of the said above described views, to indicate corresponding parts.

Referring now to the several figures of the drawings, the reference-character 1 indicates portions of the longitudinally extending side-beams of a chassis-frame for an electric vehicle, and 2 indicates the usual laterally extending beams, suitably arranged between the said side-beams and suitably connected with the said side beams at their respective ends. Suitably connected with the said side-beams 1, and the laterally extending cross-beams 2, by means of suitable brackets or angle-irons 3, is an arrangement of downwardly extending corner-posts, as 4, and intermediate posts, as 5, and to which posts 4 and 5 are suitably secured, at each side of the battery-supporting cradle, suitable transversely extending and vertically arranged side-plates 6. The corner-posts 4, at each end of the battery-supporting cradle, are also suitably connected at their lower end-portions by means of suitable tie-bars, as 7 and 7', and longitudinally extending tie-bars, as 8, these parts being all suitably arranged and connected in such a manner, so that a fixed frame-work, suitably suspended from the chassis-frame of the vehicle is provided, as will be clearly evident. The said bars 8 serve also as a means to take up the strain and shock, in the direction of the arrows $u$ and $v$, see Fig. 1, when the vehicle is suddenly stopped, thus transferring or removing all shock and strain from the movable parts and supports of the apparatus, as will be clearly evident. Suitably secured to each pair of the said posts 4 and the post 5 therebetween, by means of bolts 9, or other suitable fastening means, is an arrangement of channel-bars 10, 11, 12 and 13, the said bars being provided at suitable intervals with openings, as 14, for the arrangement therein of anti-friction rollers or balls 15, the openings 14 in the upper bar 10 and the lower bar 13 being closed by means of suitably formed plates, as 16, secured in place by means of the bolts 17, or other fastening means. Of course it will be understood that I may employ other suitable forms of anti-friction bearings, if desired.

Arranged between each pair of channel-bars 10 and 11, and 12 and 13, and mounted in sliding engagement between the respective anti-friction rollers or balls 15 in the respective openings 14 of the respective channel-bars, are the longitudinally extending I-beams 18 and 19. Suitably connected with the I-beams 18, by means of bolts 20, or other suitable fastening means are the end-portions 23 and 24 of a pair of laterally extending bars 21 and 22, and mounted upon and suitably connected with the said bars 21 and 22 is an arrangement of ribbed supporting bars 25 for the arrangement and support upon the said bars 25 of a series of storage batteries. In like manner, there are secured by means of bolts 26, or other fastening means, to the I-beams 19, the end-portions 29 and 30 of another set of laterally extending bars 27 and 28. Mounted upon and suitably connected with these bars 27 and 28 is an arrangement of ribbed supporting bars 31 for the arrangement and support thereon of another series of storage batteries.

Thus it will be clearly seen that I have provided two sliding frames for carrying the usual sets of storage batteries, one of said frames being adapted to be pulled out from underneath the chassis-frame in the direction of the arrow $y$ in Fig. 2 of the drawings, and the other sliding frame being adapted to be pulled out from underneath the chassis-frame in the direction of the arrow $z$, also shown in said Fig. 2. The movements of the said two frames in the opposite directions indicated by the arrows $y$ and $z$ are limited by the curved end-portions 24 of the laterally extending bar 22 being brought against the stop-bar 7, and by the curved end-portions 30 of the laterally extending bar 28 being brought against the stop-bar 7', all of which will be clearly understood from an inspection of Figs. 1 and 3 of the drawings. Owing to the arrangement of the I-beams 18 and 19 between the respective channel-beams 10, 11, 12 and 13, and the said I-beams, when in their pushed-in positions, extending fully from one end of the cradle to the other end thereof, the said battery-carrying frames can be pulled out to their fullest extent, without tilting, so that the storage-batteries may be easily removed and replaced by other batteries, whereupon the frames may be readily pushed back into position beneath the chassis-frame of the vehicle.

In order to lock the battery-carrying frames in their "pushed-in" positions beneath the vehicle, and to prevent the sliding movement of said frames, due to the swaying of the vehicle or when turning corners, the corner posts 4 are provided with perforated lugs, as 32, and secured to the I-beams 11 and 19 are perforated metal pieces, as 33, which are adapted to be brought into registration with the perforated lugs 32 for the reception of suitable locking pins 34.

Of course I am aware that changes may be made in the general arrangements and combinations of the several devices and parts, as well as in the details of the construction of the same, without departing from the scope of the present invention as set forth in the forthgoing specification. Hence, I do not limit my invention to the exact arrangements and combination of the various devices and parts as described in the said specification, nor do I confine myself to the exact details of the construction of the said parts, as illustrated in the accompanying drawings.

I claim:—

1. The combination with the chassis-frame of a vehicle, of a battery-supporting cradle comprising a frame-work rigidly secured to and suspended from said frame, and a battery-carrying frame slidably mounted with relation to said fixed frame-work, and means connected with said fixed frame-work and said battery-carrying frame for limiting the movements of said battery-carrying frame.

2. The combination with the chassis-frame of a vehicle, of a battery-supporting cradle comprising a frame-work rigidly secured to and suspended from said frame, and battery-carrying frames slidably mounted with relation to said fixed frame and movable in opposite directions, and means connected with said fixed frame-work and said battery-carrying frames for limiting the movements of said battery-carrying frames.

3. The combination with the chassis-frame of a vehicle, of a battery-supporting cradle comprising a frame-work rigidly secured to and suspended from said frame, a battery-carrying frame, anti-friction bearings connected with said fixed frame-work, said battery-carrying frame being slidably mounted with said fixed frame-work and said battery-carrying frame for limiting the movements of said battery-carrying frame.

4. The combination with the chassis-frame of a vehicle, of a battery-supporting cradle comprising a frame-work rigidly secured to and suspended from said frame, a pair of battery-carrying frames, anti-friction bearing connected with said fixed frame-work, said battery-carrying frames being slidably mounted upon said anti-friction bearings in opposite directions, and means connected with said fixed frame-work and said battery-carrying frames for limiting the movements of said battery-carrying frames.

5. The combination with the chassis-frame of a vehicle, of a battery-supporting cradle comprising a series of vertical posts secured to and extending downwardly from the chassis-frame, tie-bars connected with and secured to said posts, channel-bars also secured to said posts, and a battery-carrying frame movably arranged with relation to said posts and channel-bars, said battery-carrying frame comprising laterally extending supporting bars, said bars being provided at their ends with upwardly projecting members, and longitudinally extending beams secured to the respective upwardly projecting members, said longitudinally extending beams resting upon said channel-bars and being adapted to slide thereon, substantially to and for the purposes set forth.

6. The combination with the chassis-frame of a vehicle, of a battery-supporting cradle comprising a series of vertical posts secured to and extending downwardly from the chassis-frame, tie-bars connected with and secured to said posts, channel-bars also secured to said posts, and a battery-carrying frame movably arranged with relation to said posts and channel-bars, said battery-carrying frame comprising laterally extending supporting bars, said bars being provided at their ends with upwardly projecting members, longitudinally extending beams secured to the respective upwardly projecting members, and anti-friction bearings connected with said channel-bars, said longitudinally extending beams being slidably mounted upon said anti-friction bearings, substantially to and for the purposes set forth.

7. The combination with the chassis-frame of a vehicle, of a battery-supporting cradle comprising two sets of posts secured to and extending downwardly from the chassis-frame, tie-bars connected with and secured to said posts, a series of four channel-bars vertically arranged and secured to each set of said posts, and a pair of battery-carrying frames movably arranged with relation to said posts and channel-bars, said battery-carrying frames comprising laterally extending supporting bars, said bars being provided at their ends with curved members, the curved members of the one battery-carrying frame being of greater height than the curved members of the other battery-carrying frame, and longitudinally extending beams secured to the respective curved members, each longitudinally extending beam being slidably arranged between a pair of said channel-bars, substantially to and for the purposes set forth.

8. The combination with the chassis-frame of a vehicle, of a battery-supporting cradle comprising two sets of posts secured to and extending downwardly from the chassis-frame, tie-bars connected with and secured to said posts, a series of four channel-bars vertically arranged and secured to each set of said posts, and a pair of battery-carrying frames movably arranged with relation to said posts and channel-bars, said battery-carrying frames comprising laterally extending supporting bars, said bars being provided at their ends with curved members, the curved members of the one battery-carrying frame being of greater height than the curved members of the other battery-carrying frame, and longitudinally extending beams secured to the respective curved members, each longitudinally extending beam being arranged between a pair of said channel-bars, and anti-friction bearings connected with said channel-bars between and upon which said longitudinally extending beams are slidably mounted, substantially to and for the purposes set forth.

9. The combination with the chassis-frame of a vehicle, of a battery-supporting cradle comprising a frame-work rigidly secured to and suspended from said frame, and a battery-carrying frame slidably mounted with relation to said fixed frame-work, and means connected with said fixed frame-work and said battery-carrying frame for limiting the movements of said battery-carrying frame, and, means for locking the battery-supporting frame in fixed position.

10. The combination with the chassis-frame of a vehicle, of a battery-supporting cradle comprising a frame-work rigidly secured to and suspended from said frame, and battery-carrying frame slidably mounted with relation to said fixed frame and movable in opposite directions, and means connected with said fixed frame-work and said battery-carrying frames for limiting the movements of said battery-carrying frames, and means for locking the battery-supporting frame in fixed position.

11. The combination with the chassis-frame of a vehicle, of a battery-supporting cradle comprising a frame-work rigidly secured to and suspended from said frame, a battery carrying frame, anti-friction bearings connected with said fixed frame-work, said battery-carrying frame being slidably mounted upon said anti-friction bearings, and means connected with said fixed framework and said battery-carrying frame for limiting the movements of said battery-carrying frame, and means for locking the battery-supporting frames in fixed positions.

12. The combination with the chassis-frame of a vehicle, of a battery-supporting cradle comprising a frame-work rigidly secured to and suspended from said frame, a pair of battery-carrying frames, anti-friction bearing connected with said fixed frame-work, said battery-carrying frames being slidably mounted upon said anti-friction bearings in opposite directions, and means connected with said fixed frame-work and said battery-carrying frames for limiting the movements of said battery-carrying frames, and means for locking the battery-supporting frames in fixed positions.

In testimony that I claim the invention set forth above I have hereunto set my hand this 19th day of April, 1913.

STEPHEN G. THOMPSON.

Witnesses:
 FREDK. C. FRAENTZEL,
 FREDK. H. W. FRAENTZEL.